Figure 1:
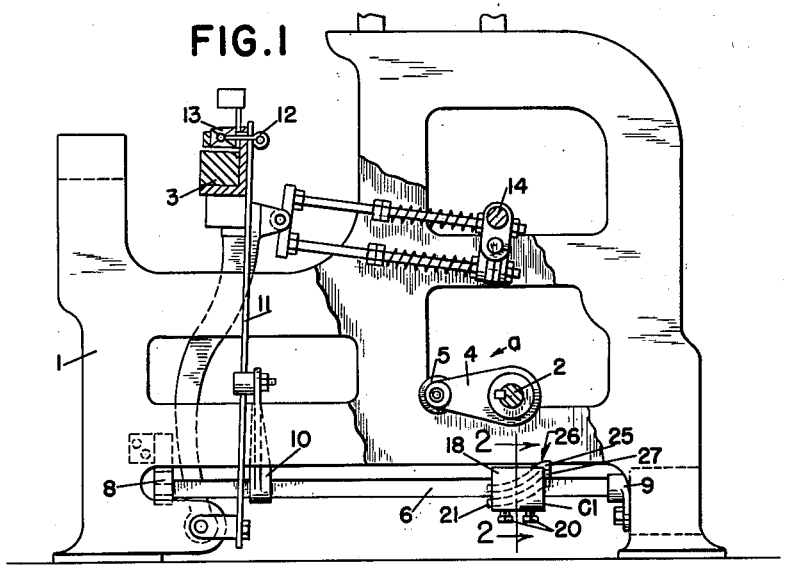

March 17, 1953 F. W. AMES 2,631,615
PICKING SHOE FOR LOOMS
Filed April 23, 1951

INVENTOR
FREDERICK W. AMES
Charles T. Hawley
ATTORNEY

UNITED STATES PATENT OFFICE 2,631,615

PICKING SHOE FOR LOOMS

Frederick W. Ames, Worcester, Mass., assignor to Crompton & Knowles Loom Works, Worcester, Mass., a corporation of Massachusetts Application April 23, 1951, Serial No. 222,377

10 Claims. (Cl. 139—147)

This invention relates to improvements in shuttle picking mechanisms for looms and it is the general object of the invention to provide an improved form of picking shoe of the type ordinarily secured to a picking shaft for cooperation with a regularly revolving picking roll or ball.

In the past it has been customary to make picking shoes as a solid casting or forging having a hub to receive the picking shaft and having a cam integral with the hub to be engaged by the revolving picking roll. Because of the rigidity of the cam with respect to the hub and the picking shaft the cam tends to rebound away from the roll during the first part at least of the picking operation and does not have continuous engagement with the roll. It is an important object of the present invention to make the picking shoe of two rigid or metallic parts, one being a hub member and the other being a cam member, and connect these parts by an element made of resilient material such as rubber or the like which permits some movement of the cam relative to the hub to permit a more nearly continuous engagement of the roll with the cam throughout the picking operation.

It is a further object of the invention to make the two rigid parts or members of the picking shoe with pockets or steps which fit the rubber element to resist endwise motion of the cam with respect to the hub member to reduce loosening of the metallic parts from the rubber.

In the operation of picking mechanisms it is occasionally desirable to be able to change the angle of the cam face with respect to the shaft on which the picking shoe is mounted. It is a further object of the present invention to introduce a resilient element between a hub member and a cam member and connect the two members by adjusting means such as screws which can be used to effect compression of one or the other of the ends of the resilient element to alter the relation of the cam with respect to the hub member. In this feature of the invention each end of the cam is preferably held to the picking shaft member by a screw and if it is desired to make the cam steeper to increase the rocking motion of the picking shaft the screw at the low end of the cam will be tightened to compress adjacent parts of the resilient element. If on the other hand it is desired to make the cam shallower to reduce rocking motion of the picking shaft the screw at the high end of the cam can be tightened to compress the upper end of the resilient element. This feature of the invention can be utilized whether the resilient element is bonded to the two members of the shoe or is separate therefrom and is held in place partly at least by the screws.

Figures 2, 3, 8:
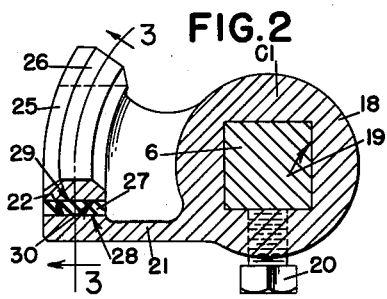
Figures 4, 5, 9:
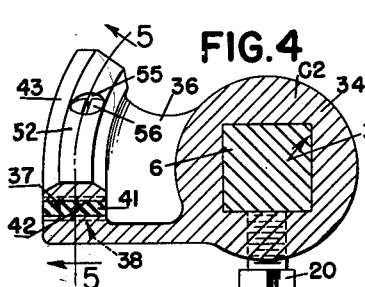
Figures 6, 7:
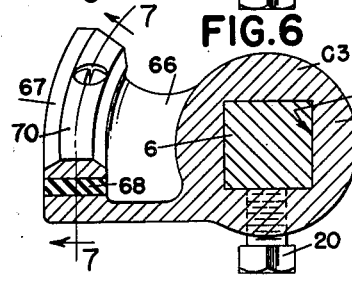

In order that the invention may be clearly understood reference is made to the accompanying drawings which illustrate by way of example three embodiments of the invention and in which:

Fig. 1 is a side elevation partly in section of a loom having the preferred form of picking shoe applied thereto, Fig. 2 is an enlarged vertical section on line 2—2, Fig. 1, Fig. 3 is a vertical section taken along line 3—3, Fig. 2, Fig. 4 is a view similar to Fig. 2 but showing the first modification of the invention, Fig. 5 is a vertical section on line 5—5, Fig. 4, Fig. 6 is a view similar to Fig. 2, but showing the second modification of the invention, Fig. 7 is a vertical section on line 7—7, Fig. 6, Fig. 8 is a diagrammatic view similar to Fig. 7, but showing the manner in which the cam member can be adjusted to make it of steeper pitch with respect to the hub member, and Fig. 9 is a view similar to Fig. 8, but showing the manner in which the cam member is adjusted to make it of shallower pitch.

Referring to Fig. 1, the loom frame 1 supports a bottom shaft 2 which rotates once for every two forward beats of the lay 3. Shaft 2 has secured thereto a picking arm 4 carrying a roll 5 to engage a cam shoe to be described hereinafter. A picking shaft 6 rocks in front and back bearings 8 and 9, respectively, and has secured to the forward end thereof a power arm 10 connected in conventional manner to a picker stick 11 which in the present instance is illustrated as associated with a picker 12 to pick a shuttle 13. The lay is reciprocated in usual manner by the top or crank shaft 14 which rotates once for each beat of the loom.

Except for the cam shoe as will be set forth hereinafter the matter thus far described is of common construction and operates in usual manner.

The preferred form of the cam shoe C1 includes a hub member 18 having a bore 19 coaxial with and receiving the shaft 6. Set screws 20 secure the shoe C1 to shaft 6 in adjusted position therealong. Hub member 18 has extending laterally therefrom an arm 21 having an upwardly facing surface 22 which may curve upwardly and to the right as viewed in Fig. 3. A cam member 25 has a cam surface 26 for engagement with the picking roll 5 and this surface and also the cam member curve upwardly and to the right, see Fig. 3.

Located between the two members 18 and 25 is a resilient element 27 which in the present instance is a soft elastic material, such as rubber, bonded directly to the two members 21 and 25. The lower surface 28 of the element 27 is bonded directly to the upwardly facing surface 22 and the upper surface 29 of the element 27 is bonded directly to the under surface 30 of the cam member 25. The bonding of the element 27 to the two members of the picking shoe holds the cam member 25 to the arm 21 without requiring other means to hold the cam member in position on the arm.

During rotation of shaft 2 in the direction of arrow a, Fig. 1, the roll 25 will first engage the low end 31 of the cam member 25 and will then move along the cam surface 26 to the high part 32 of surface 26, and in doing so will rock the picking shoe C1 and shaft 6 in a counter-clockwise direction as viewed in Fig. 2 to cause the power arm 10 to give the picker stick 11 a working or picking stroke.

In the past when the cam has been made rigid with respect to the hub member the first blow of the roll 5 against the low part of the cam has not infrequently caused a slight rebound of the cam away from the roll to be followed by a second engagement between the roll and the cam as the shaft 2 continues to rotate. This intermittent engagement between the roll and the cam surface, or bouncing of the roll along the cam, has resulted in an uneven operation of the picking mechanism, but in the present instance the bouncing or intermittent contacting between the roll and the cam is greatly reduced due to the fact that the resilient element will be compressed somewhat upon first contact of the cam by the roll and will expand if the cam should tend to move away from the roll. The resilient element therefore acts to maintain the cam member more nearly in continuous engagement with the roll 25 than has been possible heretofore.

In the first modification shown in Figs. 4 and 5, a picking shoe C2 has a hub member 34 provided with a bore 35 similar to bore 19 and has a lateral arm 36 the upwardly facing surface 37 of which is made with several pockets 38 four of which are shown in Fig. 5. These pockets preferably have square corners 39 which receive complementarily formed thickened parts 40 of a resilient element 41. In similar manner, the under surface 42 of the cam member 43 is provided with pockets 44 similar to pockets 38 and receiving thickened parts of the resilient element, as will be apparent from Fig. 5.

The resilient element of the first modification may be bonded to the two members of the cam shoe C2, but because of the thickened parts 40 of the resilient member fitting into pockets 38 and 44 it will not be necessary in all instances to have the resilient element bonded as in the preferred form. If the resilient element 41 is not bonded some means will be required to hold the cam member 43 to the arm 36 and such means are illustrated herein in the form of screws one of which is indicated at 50 adjacent to the low point 51 of the cam surface 52 of the cam member and the other of which is indicated at 53 adjacent to the high point 54 of the cam surface 52. As shown more particularly in Fig. 5 the cam member 43 is provided with a recess 55 for the head 56 of each of these screws. Each head is located below the cam surface 52 to be out of engagement with roll 5. Each screw has a shank 57 which extends through the resilient element and is screw threaded as at 58 into the arm 36. A lock nut on each of the screws will hold the latter tightly with respect to the arm 36.

In the second modification shown in Figs. 6 and 7, picking shoe C3 includes a hub member 64 having a bore 65 for shaft 6. An arm 66 similar to arm 21 extends laterally from hub member 64. A cam element 67 more or less similar to the cam member 25 of the preferred form is provided for the shoe C3 and a resilient element 68 is bonded to the arm 66 and cam member 67 in a manner similar to that already described in connection with the preferred form of the invention. Adjacent to the low point 69 of the cam surface 70 of member 67 is a screw 71 similar to screw 50, and adjacent to the high point 72 of the surface 70 is a second screw 73 similar to screw 53.

In the two modifications the resilient elements by their compression and expansion will behave much in the same manner as that described in connection with the resilient element of the preferred form, but in addition the first and second modifications provide an additional feature which permits some adjustment of the cam surface which engages the picking roll 5 with respect to the bore of the hub member. This adjustment is shown more particularly in connection with the second modification, but it is to be understood that a similar adjustment is possible with respect to the first modification.

Referring particularly to Fig. 8, the full lines show the normal position of the cam member 67 and surface 70 with respect to the hub member when the screws 71 and 73 are adjusted so as to require little or no compression of the resilient member. If it be desired to increase the power of the picking shoe by making the surface 70 steeper the lower screw 71 will be tightened to effect some compression of the adjacent end of the resilient element so that the cam surface 70 will take some such position as shown in dotted lines in Fig. 8. By means of adjustments well-known in the art of picking the roll 5 can be caused to engage the lower end 69 of the surface 70 when the latter is as shown in dotted lines in Fig. 8, and since this lower end will be at a lower level with respect to the high point 72 than is the case when the resilient element is in normal condition a greater amount of angular motion will be imparted to the picking shoe C3 and the shaft 6.

If on the other hand it be desired to reduce the amount of rocking of shaft 6 by the roller 5 the lower screw 71 will be left in its normal position but the upper screw 73 will be tightened to cause the surface 70 to assume some such position as shown in dotted lines in Fig. 9. Under these conditions the high point of the cam will be somewhat lower with respect to the low point than is the case when the resilient member is in its normal undeformed condition. It will be understood that in these adjustments the cam surface will be altered with respect to the axis of the bore of the hub member.

In the first modification the pockets 38 and 44 by their reception of the thickened parts 40 of the resilient member will tend to hold the latter and the cam member against a generally horizontal movement relative to the hub member and thereby position the cam member even though the resilient member is not bonded to the arm 36. The adjustment of the cam surface 52 by means of screws 50 and 53 can be effected in the manner similar to that described in connection with the second modification.

From the foregoing it will be seen that the invention sets forth a simple form of picking shoe wherein a resilient element is interposed between the hub and cam members enabling the latter member to move slightly with respect to the hub member during the first part of the engagement of roll 5 with the cam surface to insure a more nearly continuous engagement of the roll with the cam surface. In the first and second modifications means are provided for effecting adjustment of the cam surface with respect to the bore of hub member either to increase or lessen the amount of rocking of the picking shoe and shaft 6 by the roll 5. In the first modification the hub and cam members are provided with pockets to receive complementarily formed thickened parts of the resilient element and because of this construction it is not essential that the resilient element be bonded to the members. Although the bores of the hub members are of rectangular cross-section to fit shaft 6, this is not an essential feature of the invention.

Having now particularly described and ascertained the nature of the invention and in what manner the same is to be performed, what is claimed is:

1. In a picking shoe for loom having a picking shaft, a hub member having a bore for the picking shaft, a cam member extending generally in the direction of the length of the bore, an element of soft elastic material between said members, and adjustable means adjacent each end of the cam member operatively connecting said members, each means capable of effecting compression of the element to vary the position of the cam member with respect to said bore.

2. In a picking shoe for loom having a picking shaft, a hub member having a bore to receive the picking shaft, a cam member extending generally in the direction of the length of said bore, an element of soft elastic material between said members, and screw means adjacent to each end of the cam member operatively connecting the latter member to the hub member, each screw means capable of compressing said element to vary the position of the cam member with respect to said bore.

3. The structure set forth in claim 2 wherein said screw means passes through the element and positions the latter with respect to said members.

4. The structure set forth in claim 2 wherein said element comprises a body of rubber bonded to the members.

5. The structure set forth in claim 2 wherein at least one of said members is formed with pockets and said element has parts thereof extending into the pockets.

6. The structures set forth in claim 2 wherein each member is formed with pockets and the element has portions thereof extending into said pockets.

7. In a picking shoe for loom having a picking shaft, a hub member having a bore for the picking shaft, a cam member extending generally in the direction of the length of the bore, an element of soft elastic material between said members, and attaching means at one end of the cam member operatively connecting the latter to the hub member and capable of effecting compression of the element to vary the disposition of the cam member with respect to said bore.

8. In a picking shoe for loom having a picking shaft, a hub member having a bore to receive a picking shaft, a cam member, an element of soft elastic material between said members, and means to effect compression of said element in a direction from the cam member toward the hub member to vary the disposition of the cam member with respect to the bore.

9. The structure set forth in claim 8 wherein said means operatively connects the hub and cam members.

10. The structure set forth in claim 8 wherein said means is capable of applying a compressing force to said element at two spaced points therealong and is capable of effecting compression of the element at either of said points.

FREDERICK W. AMES.

REFERENCES CITED

The following references are of record in the file of this patent:

UNITED STATES PATENTS

| Number | Name | Date |
| --- | --- | --- |
| 233,398 | Briggs | Oct. 19, 1880 |
| 2,481,812 | Beatrice | Sept. 13, 1949 |
| 2,496,168 | Lee et al. | Jan. 31, 1950 |
| 2,564,747 | Blanchard | Aug. 21, 1951 |